US008472699B2

(12) United States Patent
Ng et al.

(10) Patent No.: US 8,472,699 B2
(45) Date of Patent: Jun. 25, 2013

(54) ARRANGEMENT AND METHOD FOR THREE-DIMENSIONAL DEPTH IMAGE CONSTRUCTION

(75) Inventors: Andrew Y. Ng, Stanford, CA (US); Ashutosh Saxena, Redwood City, CA (US); Sung Hwan Chung, San Jose, CA (US); Min Sun, Princeton, NJ (US)

(73) Assignee: Board of Trustees of the Leland Stanford Junior University, Palo Alto, CA (US)

( * ) Notice: Subject to any disclaimer, the term of this patent is extended or adjusted under 35 U.S.C. 154(b) by 1325 days.

(21) Appl. No.: 11/944,017

(22) Filed: Nov. 21, 2007

(65) Prior Publication Data

US 2008/0137989 A1 Jun. 12, 2008

Related U.S. Application Data

(60) Provisional application No. 60/903,187, filed on Feb. 23, 2007, provisional application No. 60/860,775, filed on Nov. 22, 2006.

(51) Int. Cl.
*G06K 9/00* (2006.01)

(52) U.S. Cl.
USPC .............................. 382/154; 382/106; 348/42

(58) Field of Classification Search
USPC ..................................... 382/106, 154; 348/42
See application file for complete search history.

(56) References Cited

U.S. PATENT DOCUMENTS

| 6,157,733 | A | * | 12/2000 | Swain | 382/154 |
| 6,229,913 | B1 | * | 5/2001 | Nayar et al. | 382/154 |
| 6,252,982 | B1 | * | 6/2001 | Haisma et al. | 382/154 |
| 2010/0067865 | A1 | | 3/2010 | Saxena et al. | |

OTHER PUBLICATIONS

Saxena et al. "Robust Facial Expression Recognition Using Spatially Localized Geometric Model." ICS, Cybernetics & Information (Feb. 12-15, 2004), p. 124-129.
Michels et al. "High Speed Obstacle Avoidance Using Monocular Vision and Reinforcement Learning." Proceedings of the $22^{nd}$ ICML (2005), 8 pgs.
Saxena et al. "Learning to Grasp Novel Objects Using Vision." $10^{th}$ Int'l Symposium Exper. Robotics (2006), 10 pgs.
Hoiem et al. "Geometric Context from a Single Image." ICCV (2005), p. 1-8.
Hoiem et al. "Putting Objects in Perspective." CVPR (2006), 8 pgs.
Felzenszwalb et al. "Efficient Graph-Based Image Segmentation." Int'l J. Computer Vision 59(2) (Sep. 2004), p. 1-26.
Broida et al. "Recursive 3-D Motion Estimation from a Monocular Image Sequence." IEEE Trans. On Aerospace & Electronic Systems 26(4) (Jul. 1990, p. 639-656.

* cited by examiner

*Primary Examiner* — John Strege

(57) ABSTRACT

Three-dimensional image data is generated. According to an example embodiment, three-dimensional depth information is estimated from a still image. A set of monocular images and their corresponding ground-truth depth maps are used to determine a relationship between monocular image features and the depth of image points. For different points in a particular image, the determined relationship is used together with local and global image features including monocular cues to determine relative depths of the points.

36 Claims, 5 Drawing Sheets

ARRANGEMENT AND METHOD FOR THREE-DIMENSIONAL DEPTH IMAGE CONSTRUCTION

RELATED PATENT DOCUMENTS

This patent document claims the benefit, under 35 U.S.C. §119(e), of U.S. Provisional Patent Application Ser. No. 60/903,187, entitled Arrangement and Method for 3-D Depth Reconstruction from a Still Image and filed on Feb. 23, 2007; and of U.S. Provisional Patent Application Ser. No. 60/860,775, entitled 3-D DEPTH RECONSTRUCTION FROM A SINGLE STILL IMAGE and filed on Nov. 22, 2006; each of these patent applications, including the Appendices therein, is fully incorporated herein by reference.

FEDERALLY-SPONSORED RESEARCH OR DEVELOPMENT

This invention was made with Government support under contract FA8650-04-C-7134 awarded by the Defense Advanced Research Projects Agency. The Government has certain rights in this invention.

FIELD OF THE INVENTION

The present invention is directed to image reconstruction arrangements and methods and to 3-D depth reconstruction arrangements and methods.

BACKGROUND

Images are the projection of the three-dimensional (3-D) world to two dimensions. In this regard, the two-dimensional (2-D) images are generally not readily useful in generating or determining 3-D image features which makes inferring 3-D structure from an image difficult. An image might represent an infinite number of 3-D models. However, not all the possible 3-D structures that an image might represent are valid, and only a few are likely.

When viewing a typical three-dimensional 3-D image such as a photograph, a human can interpret 3-D structure represented by the image without significant loss of intended perspective. Generally, the environment that we live in is reasonably structured, and hence allows humans to infer 3-D structure based on prior experience. Humans use various monocular cues to infer the 3-D structure of the scene. Some of the cues are local properties of the image, such as texture variations and gradients, color, haze and defocus, yet local image cues alone are usually insufficient to infer the 3-D structure. Humans thus "integrate information" over space to understand the relation between different parts of an image, which is important to the human understanding of 3-D structure. Both the relation of monocular cues to 3-D structure, as well as relation between various parts of an image, is learned from prior experience. For example, humans remember that a structure of a particular shape is a building, sky is blue, grass is green, trees grow above the ground and have leaves on top of them, and so on.

For many computer vision systems, however, interpreting 3-D structure represented by a 2-D image is extremely challenging largely due to loss in depth perspectives. Ambiguities result, for example, relative to loss of details in local image structures relative to details in other structures and to general distortion of the 3-D structure. For computer vision systems, there are intrinsic ambiguities between the local image features and the 3-D location of the points used to depict projection of the depth.

Such issues have presented challenges to providing accurate image-based information as well as to providing accurate interpretation of image-based information.

SUMMARY

The present invention is directed to overcoming the above-mentioned challenges and others related to the types of devices and applications discussed above and in other applications. These and other aspects of the present invention are exemplified in a number of illustrated implementations and applications, some of which are shown in the figures and characterized in the claims section that follows.

According to an example embodiment of the present invention, a three-dimensional depth map is estimated from still image data. A set of monocular images and corresponding ground-truth depth maps are used to determine a relationship between monocular image features and the depth of points in the monocular images. For different points in a particular image, the determined relationship is used together with local and global image features including monocular cues to determine relative depths of the different points.

According to another example embodiment of the present invention, three-dimensional depth is estimated from a still image using a model based upon a set of monocular images and their corresponding ground-truth depth maps. For each of a plurality of different points in an image exhibiting local features for each point and global features for the entire image, the model is used together with local and global image feature data including monocular image cues to determine a relative depth of the point.

According to another example embodiment of the present invention, three-dimensional image data is estimated from still image data using image regions. A set of monocular images and corresponding ground-truth depth maps are used to determine a relationship between monocular image features and the depth of points in the monocular images. For each of a plurality of different regions in a still image, each region including a plurality of contiguous points in the image, the determined relationship is used together with both local and global image features including monocular cues to determine the depth of the region relative to a reference location. This relationship and the features are also used to determine the depth of the region relative to other regions in the image, and the determined depths are used to generate a three-dimensional image with the different regions of the image.

According to another example embodiment, a three-dimensional image is generated from a still image. For each of a plurality of homogeneous regions in the image, a set of parameters that represent the location and orientation of the region are determined as a function of region characteristics including, relative to immediately adjacent regions, the connectivity, planarity and linearity of the region. The parameters and data characterizing the homogeneous regions are used to generate a three-dimensional image.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings in which.

Figure 1:
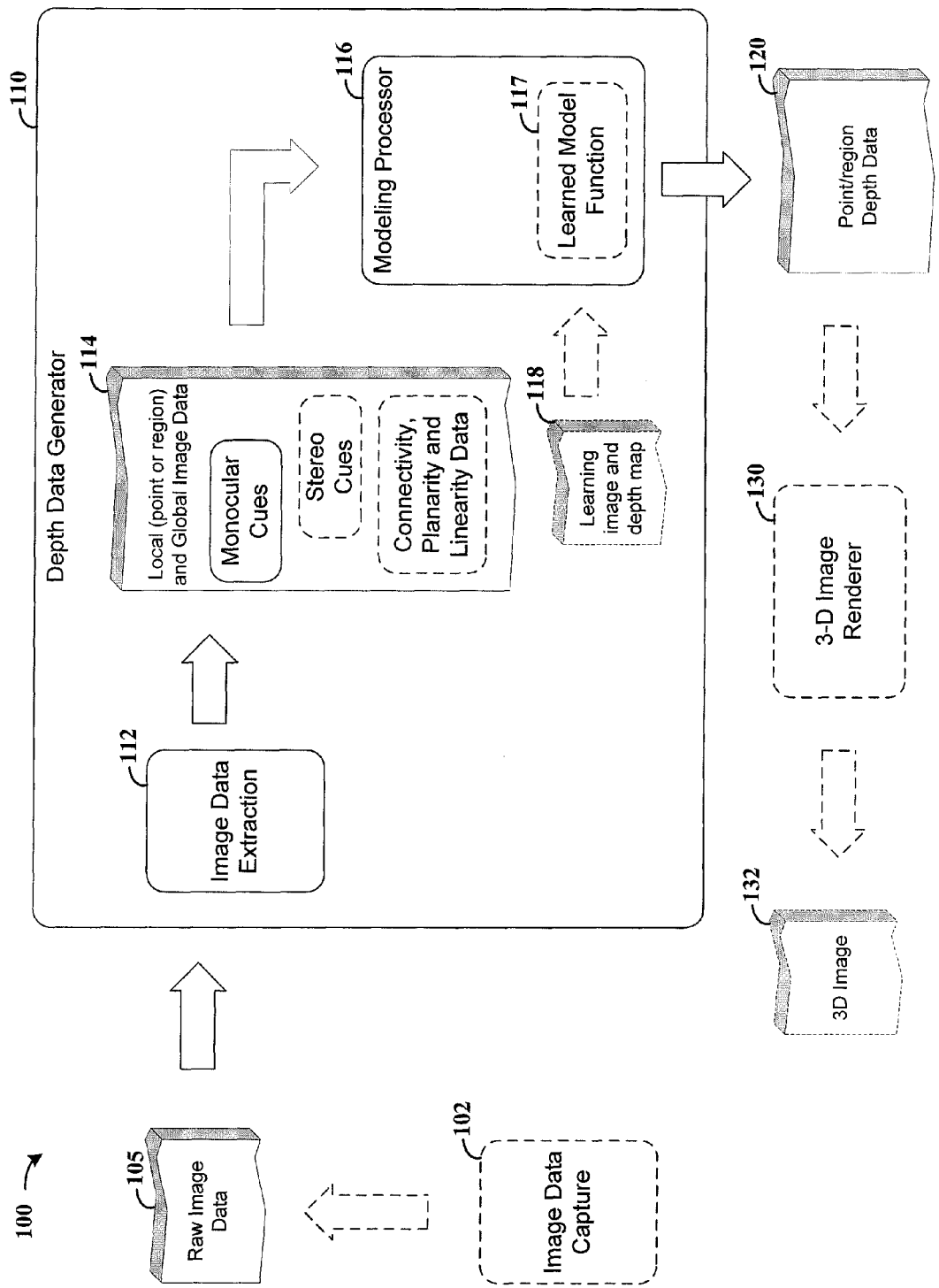
FIG. 1 shows a system for generating three-dimensional image data, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is directed to the above and related types of 3-D image reconstruction and analysis systems. These and other aspects of the present invention are exemplified in a number of illustrated implementations and applications, some of which are shown and characterized in the following description, the figures, and the claims section that follows.

According to an example embodiment of the present invention, the depth of each of a plurality of points in a scene is estimated from a single still image. Depths and relationships between depths are modeled at multiple spatial scales and used to estimate the depth of points in the image. This estimation is then used to construct three-dimensional (3-D) information about the scene. This modeling approach may, for example, be carried out using a hierarchical, multi-scale Markov Random Field (MRF).

In some applications, a supervised learning approach is used to facilitate the depth estimation. A 3-D scanner is used to collect training data and various images are modeled and compared to actual data. This information is used in subsequently estimating depths for images having features with unknown depths, such as in using a MRF as described above. These approaches are applicable to imaging in a variety of unstructured environments, both indoor and outdoor, and involving features such as forests, sidewalks, buildings, people, bushes, earth, sky and others. In addition, these approaches are applicable to autonomous obstacle avoidance.

In other applications, monocular cues from a single image as described above are incorporated into a stereo system. The monocular cues and (purely geometric) stereo cues give largely orthogonal, and therefore complementary, types of information about depth.

In one embodiment involving point-based depth estimation with a still image, the image is divided into small rectangular patches, and a single depth value is estimated for each patch. Absolute depth features are used to estimate the absolute depth at a particular patch, and relative features are used to estimate relative depths (e.g., magnitude of the difference in depth between two patches). These features capture local feature processing (e.g., absolute features), such as determining that the sky is far away, and continuity features (e.g., relative features), to determine whether two adjacent patches are physically connected in 3-D and thus have similar depths.

Features that are used in these approaches include those that capture local cues including texture variations, texture gradients, and color. In some applications, Laws' masks (see, e.g., Davies 1997; Michels et al. 2005) are used to compute the texture energy. Haze is reflected in the low frequency information in the color channels, and is captured by applying a local averaging filter (the first Laws' mask) to the color channels. An estimate of texture gradient that is robust to noise is computed by convolving the intensity channel with six oriented edge filters. Other features are included in various applications, such as those relating to atmospheric effects such as fog and haze, features computed from the physics of light scattering, and features based on surface shading.

In one example embodiment, to compute depth, summary statistics of a patch "i" in an image I (x, y) are processed as follows. The output of each of the 17 (9 Laws' masks, 2 color channels and 6 texture gradients) filters where $$F_n n=1, \ldots, 17 \text{ as}; E_i(n) = \Sigma_{(x,y) \in patch(i)} |I*F_n|_k$$

where
$k \in \{1, 2\}$
give the sum absolute energy and sum squared energy respectively. This gives an initial feature vector of dimension 34. To estimate the absolute depth at a patch, local image features are used together with global properties of the image, by using image features extracted at multiple spatial scales (image resolutions). Objects at different depths exhibit very different behaviors at different resolutions, and using multi-scale features facilitates the capture of these variations. For example, blue sky may appear similar at different scales, but textured grass would not; such information is used to process the image patches in determining related characteristics. In addition to capturing more global information, features are computed at multiple spatial scales to account for different relative sizes of objects. A closer object appears larger in the image, and hence will be captured in the larger scale features. The same object when far away will be small and hence be captured in the small scale features. Features capturing the scale at which an object appears can therefore be used to provide strong indicators of depth.

To capture additional global features (e.g., occlusion relationships), the features used to predict the depth of a particular patch are computed from that patch as well as the four neighboring patches. This is repeated at each of the scales used, so that the feature vector at a patch includes features of its immediate neighbors, its neighbors at a larger spatial scale (thus capturing image features that are slightly further away in the image plane), and again its neighbors at an even larger spatial scale.

Other structural features, such as trees and buildings found in outdoor scenes, show vertical structure in the sense that they are vertically connected to themselves (i.e., things generally do not hang in empty air). Thus, additional summary features are added to the features of a patch of the column it lies in. For each patch, after including features from itself and its neighbors (adjacent patches) at the scales used, and summary features for its column patches, an absolute depth feature vector x is 19×34=646 dimensional.

A different feature vector is used to characterize the dependencies between two neighboring patches. A 10-bin histogram is computed of each of the (17) filter outputs |I×Fn|, giving us a total of 170 features $y_{i,s}$ for each patch i at scale s.

These features are used to estimate how the depths at two different locations are related. Generally, learning these estimates uses less global information than predicting absolute depth, but more detail from the individual patches. For example, given two adjacent patches of a distinctive, unique, color and texture, the patches can be characterized as part of the same object, and thus as having close depths. Hence, relative depth features $Y_{ijs}$ for two neighboring patches i and j at scale s is the differences between their histograms (i.e., $y_{ijs}=y_{is}-y_{js}$).

In another embodiment related to the above discussion, a hierarchical multi-scale Markov Random Field (MRF) is used in modeling the relationship between the depth of a patch and the depths of its neighboring patches, using interactions between depths at multiple spatial scales. Such an MRF may be implemented as described, for example, in the above-referenced provisional patent application Ser. No. 60/860,775.

In another example embodiment also related to the above discussion, a Laplacian model is used to model the posterior distribution of depths in an image. This approach also takes multiple spatial scales into consideration in modeling depths of an image. Such a Laplacian model may be implemented as described, for example, in the above-referenced provisional patent application Ser. No. 60/860,775.

According to another example embodiment of the present invention, detailed 3-D structure that is both quantitatively accurate as well as visually pleasing is inferred from an image of a scene by processing small planar-type regions of the image. Other than "local planarity," explicit assumptions are not necessarily made about the structure of the scene; this facilitates the generalization of image construction approaches, and is applicable to scenes with significant non-vertical structure. Both the 3-D location and the orientation of small planar regions in the image are inferred using a Markov Random Field (MRF). MAP inference is performed by solving a linear program. Using this approach, qualitatively correct and visually pleasing 3-D models are inferred automatically.

In some applications, a relationship between image features and the location/orientation of small planar regions in the image, as well as relationships between various parts of images, are learned via supervised learning. For various applications, such an approach involves using sample images of a generally random scope or of images similar to those for which a 3-D scene is to be generated. The learned relationships are then used in characterizing and processing additional image data.

Another embodiment is directed to the use of information from two or more images from a particular scene, using planar regions together with local and global features as described above, but from more than one image. The different images are processed together to create 3-D image data. Additional multi-image characteristics are selectively used as well, such as triangulation-type information to identify characteristics (e.g., depths) of planar regions. Regions in different images that are very closely related are processed as more likely relating to a corresponding point in a scene.

For certain embodiments involving the use of two or more images, the "confidence" in a particular match between images is modeled by estimating the probability of the match being correct. To estimate how likely a match is correct, neighboring 3-D matches are used as a cue. For example, a group of spatially consistent 3-D matches is more likely to be correct than a single isolated 3-D match. This is captured using a feature vector that counts the number of matches found in a present superpixel and in larger surrounding regions (i.e., at multiple spatial scales), as well as measures the relative quality between the best and second best match. These correspondences are used directly in a probabilistic model without requiring explicit estimation of the 3-D locations of the points.

For some applications, depths are computed using a triangulation approach by first using monocular approximate depths to remove scale ambiguity, and then using bundle adjustment to refine any matches. To begin, 128 SURF features (described below) are computed, and matches are calculated based on Euclidean distances between the features found. A bundle adjustment is used to compute camera poses Q=[Rotation, Translation] $\in R^{3\times 4}$ and the depths of the points matched. For general information regarding bundle adjustment and the use of SURF features, and for specific information regarding approaches that may be implemented in connection with one or more example embodiments of the present invention, reference may be made to M. Lourakis and A. Argyros, "A generic sparse bundle adjustment c/c++ package based on the levenberg-marquardt algorithm," Foundation for Research and Technology—Hellas, Tech. Rep., 2006; and to H. Bay, T Tuytelaars, and L. V. Gool, "Surf: Speeded up robust features," in ECCV, 2006, both of which are fully incorporated herein by reference.

The above triangulation approaches are applicable to a variety of image processing approaches. In some applications, large 3-D reconstructions are made for outdoor environments using a relatively small number of images. Each of the images is segmented into a number of small planes, and the 3-D position and orientation of each plane in every image is simultaneously inferred. Using MRF, both monocular depth cues and triangulation cues are used, while further taking into account various properties of the real world, such as occlusion, co-planarity, and others, to generate 3-D image data.

In the above and other contexts, the terms "planar" or "coplanar" and related terms generally refer to image regions that are relatively flat. However, such regions may not necessarily be in a true plane, and as such may involve some roughness. For instance, an image of a scene including a field and sky would involve planar regions of the field, and planar regions of the sky, each likely having features that are not in a true plane. In this context, reference to such "planar" regions, also referred to in various embodiments as "superpixels" contemplates features that generally exhibit planarity but do not necessarily involve features that are limited to those that lie in a mathematical plane.

One approach to determining 3-D image data involves first determining small, relatively homogeneous regions in the image, which are referred to as superpixels for discussion. These superpixels are found or determined using over-segmentation, and represent a coherent region in the image with all the pixels having similar properties. In most images, a superpixel is a small part of a structure, such as part of a wall, and therefore represents a plane. Generally, these regions are homogeneous in that they include generally similar features, though all features in each region are not necessarily all homogeneous.

An algorithm is used to obtain the superpixels, and is tailored to meet particular applications as appropriate. In one embodiment, an image is over-segmented into well over a thousand superpixels (e.g., about 2000 superpixels, or more), with each superpixel representing regions that have similar color and texture features. Other approaches involve generating superpixels with additional and/or other features. Generally, the algorithm and representation of superpixels is set in accordance with particular applications to accurately infer the location and orientation of each of the superpixels. For general information regarding segmentation, and for specific information regarding approaches to segmentation that may be implemented in connection with one or more example embodiments of the present invention, reference may be made to Pedro F. Felzenszwalb and Daniel P. Huttenlocher, "Efficient Graph-Based Image Segmentation," International Journal of Computer Vision, Vol. 59, No. 2, September 2004, which is fully incorporated herein by reference.

Both local and global cues are used to infer 3-D information of regions in the image, or superpixels. For many applications, one or more of the following image properties are used as cues:

Image Features and depth: The image features of a superpixel bear some relation to the depth (and orientation) of the superpixel.

Connected structure: Except in case of occlusion, neighboring superpixels are more likely to be connected to each other.

Co-planar structure: Neighboring superpixels are more likely to belong to the same plane, if they have similar features and if there are no edges between them.

Co-linearity: Long straight lines in the image represent straight lines in the 3-D model; this is applicable, for example, to edges of buildings, sidewalks and windows.

All of these four properties can be used together to reliably compute the 3-D structure of an image.

FIG. 1 shows a system 100 for generating three-dimensional image data, according to an example embodiment of the present invention. The system 100 includes a depth data generator 110 that receives and processes raw image data 105 to facilitate the generation of point or regional depth data 120. The depth data generator 110 includes an image data extraction circuit 112 that generates local (point or region) and global image data 114. This generated data includes monocular cues from the raw image data 105 and, where the raw image data includes data from two or more images, stereo cues as well. In some applications, the extracted image data also includes planar data identifying planar regions in the raw image data 105, including connectivity, planarity and linearity data for each of the planar regions. This data is sent to a modeling processor 116 that generates the point/region depth data 120.

In some applications, the modeling processor 116 employs a learned model function 117 that uses learning image and depth mapping data. For example, several to hundreds of sample images with known depth maps may be processed by the depth data generator 110, with generated depth results compared to actual depth results. The learning image and depth map data 118 can be generated using these results, and used via the learned model function to adjust or set processing parameters used by the modeling processor 116 in generating image data.

In certain embodiments, the system 100 includes one or both of an image data capture device 102 and an image generator 130. The image data capture device 102 is a camera or other device that generates two-dimensional image data (raw image data 105) and passes that data to the depth data generator 110. The image generator 130 uses the point/region depth data 120 to generate three-dimensional image data 132, that can be used to create a three-dimensional image. In these contexts, some or all of these devices and components may be implemented in a common arrangement, such as by combining the image generator 130 with the depth data generator 110 in a computer arrangement to generate three-dimensional image data from digital image data from a single two-dimensional image.

Figure 2:
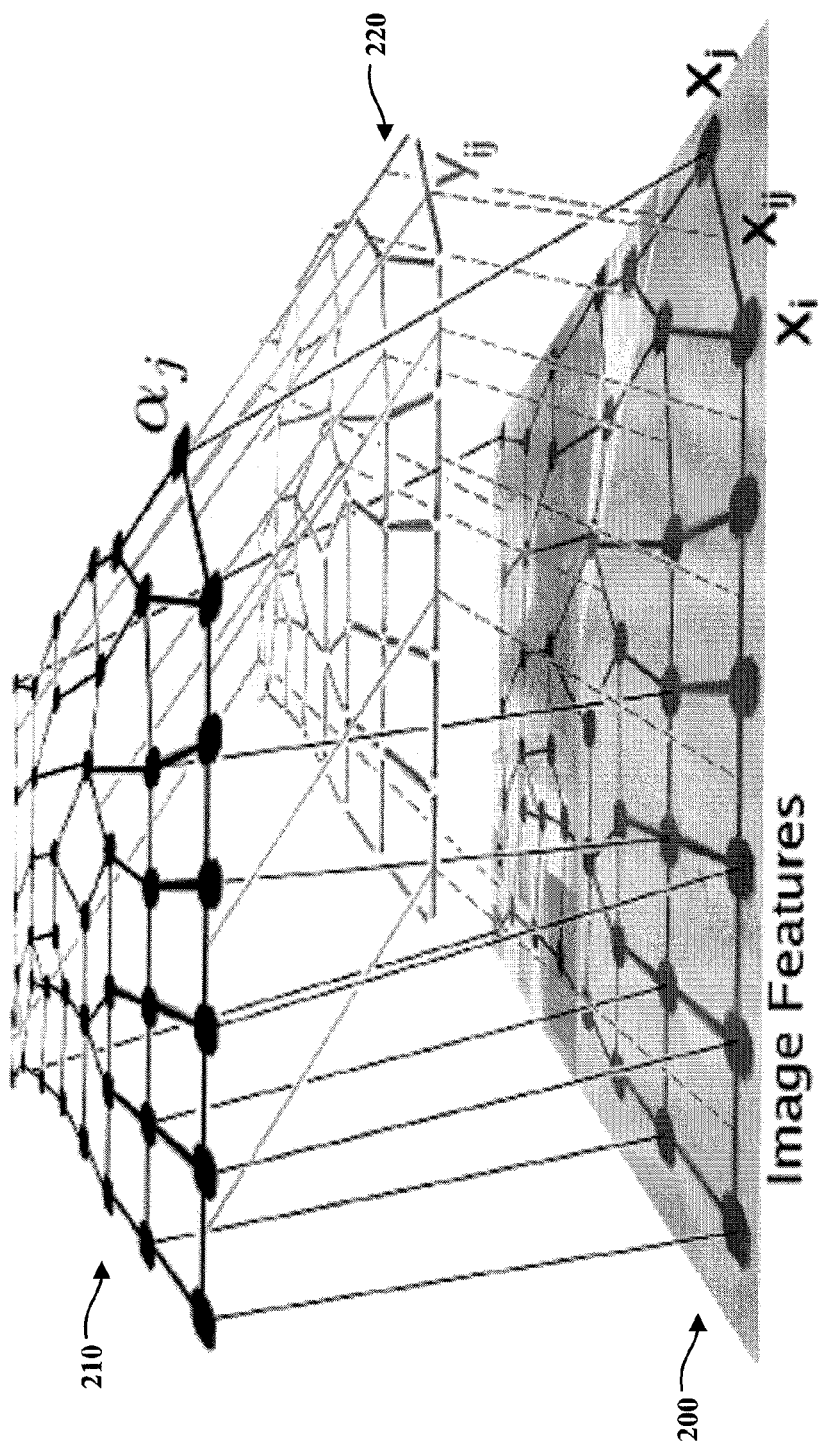
FIG. 2 shows planar regions generated for use with the generation of three-dimensional image data, according to another example embodiment of the present invention.

In some embodiments, local and global properties are combined in an Markov Random Field (MRF), in a way that depends on a "confidence" in each of these properties as may be determined for specific image types or groups of images, or otherwise determined. In this context, FIG. 2 shows an approach to inferring three-dimensional structure from a single image using a MRF, according to one example embodiment. Image features are represented in the two-dimensional region 200, and from these features, a MRF 210 is used with these structures to infer three-dimensional image data 220 pertaining, for example, to occlusion boundaries and folds. This information is generated using both local and global cues as described above.

The confidence is itself estimated from local image cues and varies from region to region in an image. Places or image portions where there is no connected or co-planar structure are determined by inferring variables that indicate the presence or absence of occlusion boundaries and folds in the image. The 3-D structure is then inferred using a plane parameter MRF that uses the variables to selectively enforce coplanar and connected structure property. This MRF approach generates model data for the 3-D location and orientation of superpixels as a function of image features. More detailed approaches relating to these embodiments are discussed below.

The location of occlusion boundaries and folds (e.g., image portions where two planes are connected but not coplanar) are inferred as follows. The variables $y_{ij} \in \{0, 1\}$ are used to indicate whether an "edgel" (the edge between two neighboring superpixels) is an occlusion boundary/fold or not. The inference of these boundaries is typically not completely accurate; therefore we will infer soft values for $y_{ij}$. More formally, for an edgel between two superpixels i and j, $y_{ij}=0$ indicates an occlusion boundary/fold, and $y_{ij}=1$ indicates none (i.e., a planar surface). The variable $y_{ij}$ is modeled using a logistic response as $P(y_{ij}=1|x_{ij}; \Psi)=1/(1+\exp(-\Psi^T x_{ij}))$ where, the variable $x_{ij}$ represents features of the superpixels i and j, and $\Psi$ represents the parameters of the model. During inference, we will use a mean field-like approximation, where we replace $y_{ij}$ with its mean value under the logistic model. Aspects and embodiments corresponding to these approaches are discussed further below.

Figure 3:
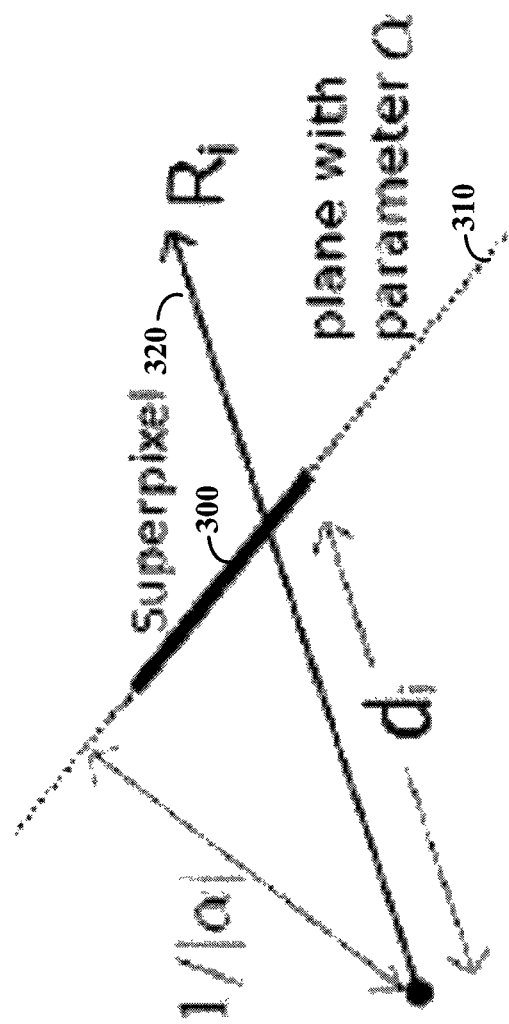
FIG. 3 shows a two-dimensional representation of plane parameters used in generating three-dimensional image data, according to another example embodiment of the present invention.

A plane parameter MRF is executed, with each node representing a superpixel in the image. An assumption is made that each superpixel lies on a plane, and the location and orientation of that plane is thus inferred and used to determine image data. Both the location and orientation of the infinite plane on which the superpixel lies is inferred. FIG. 3 represents a 2-D illustration for a superpixel 300 lying in a plane 310, characterizing the plane parameter α and rays R (320) from a camera used to capture a 2-D image, using plane parameters $\alpha \in R^3$. Generally, any point $q \in R^3$ lying on the plane with parameters α satisfies $\alpha^T q=1$. The value $1/|\alpha|$ is the distance from the camera center to the closest point on the plane, and the normal vector $$\hat{\alpha} = \frac{\alpha}{|\alpha|}$$

gives the orientation of the plane. If $R_i$ is the unit vector from the camera center to a point i lying on a plane with parameters α, then $d_i=1/R_i^T \alpha$ is the distance of point i from the camera center.

The fractional (or relative) error in depths is used in structure for motion, stereo reconstruction, and other aspects. For ground-truth depth d, and estimated depth d̂, fractional error is defined as $$(d - \hat{d})/d = d/d - \hat{d}/d = \hat{d}/d - 1$$

To capture the relation between the plane parameters and the image features, and other properties such as co-planarity, connectedness and co-linearity, the MRF is formulated as $$P(\alpha \mid X, Y, R; \theta) = \frac{1}{Z} \prod_i f_\theta(\alpha_i, X_i, y_i, R_i) \qquad (1)$$
$$\prod_{i,j} g(\alpha_i, \alpha_j, y_{ij}, R_i, R_j)$$

where, $\alpha_i$ is the plane parameter of the superpixel i. For a total of $S_i$ points in the superpixel i, $x_i$, $s_i$ denote the features for point $s_i$ in the superpixel i.
$X_i = \{x_i, s_i \in R^{524}: s_i = 1, \ldots, S_i\}$ are the features for the superpixel i. Similarly, $R_i = \{R_i, s_i: s_i = 1, \ldots, S_i\}$ is the set of rays for superpixel i.

The first term $f_1(.)$ models the plane parameters as a function of the image features $x_i, s_i$. Thus, $$R_d^T \alpha_d = 1/d_d$$

(where $R_i, s_i$ is the ray that connects the camera to the 3-d location of point $s_i$), where the estimated depth is $$d_d = x_d^T \theta_r,$$

then the fractional error would be $$(R_d^T \alpha_i (x_d^T \theta_r) - 1).$$

Therefore, the aggregate fractional error is minimized (e.g., reduced mathematically) over all the points in the superpixel, by modeling the relation between the plane parameters and the image features as $$f_\theta(\alpha_i, X_i, y_i, R_i) = \exp\left(-\sum_{s_i=1}^{S_i} v_{i,s_i} |R_{i,s_i}^T \alpha_i (x_{i,s_i}^T \theta_r) - 1|\right).$$

The parameters of this model are $\theta_r \in R^{524}$. Where images are taken from a horizontally-mounted camera, different parameters ($\theta_r$) are used for each row r in the image, as different rows of the image have different statistical properties (e.g., a blue superpixel might be more likely to be sky if it is in the upper part of image, or water if it is in the lower part of the image). Here, $y_i = \{v_i, s_i: s_i = 1, \ldots, S_i\}$ and the variable $v_i, s_i$ indicates the confidence of the features in predicting the depth $d_d$, at point $s_i$. If the local image features were not strong enough to predict depth for point $s_i$, then $v_i, s_i = 0$ turns off the effect of the term $$|R_d^T \alpha_i (x_d^T \theta_r) - 1|$$

The second term g(.) models the relation between the plane parameters of two superpixels and j. It uses pairs of points $s_i$ and $s_j$ to do so:

$$g(.) = \Pi_{\{s_i, s_j\} \in N} h_{s_i, s_j}(.) \qquad (2)$$

Co-planarity, connectedness and co-linearity are captured by different choices of h(.) and $\{s_i, s_j\}$.

Figures 4A, 4B, 4C:
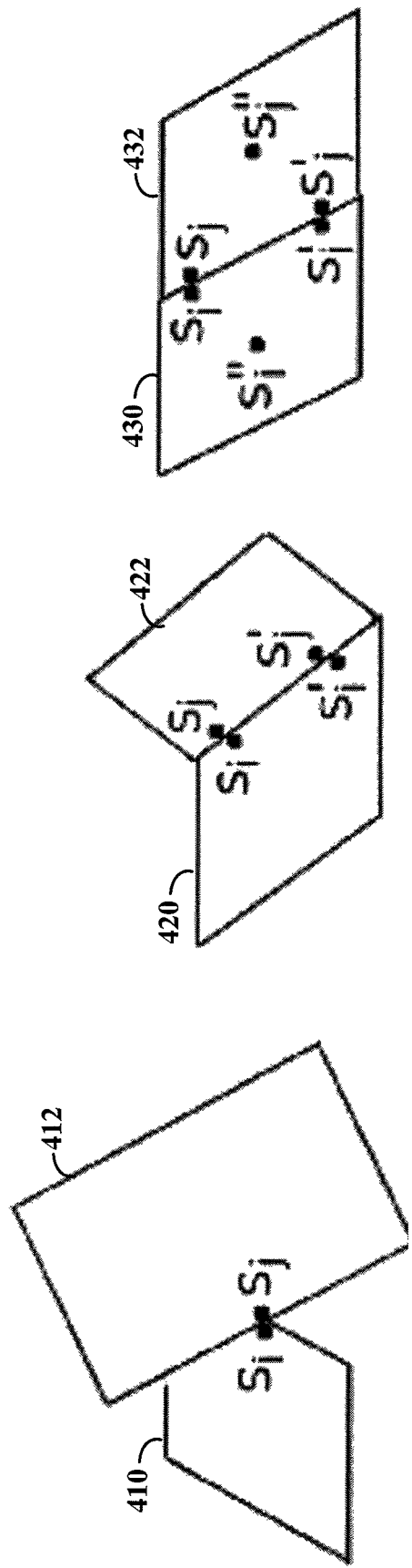
FIGS. 4A-4C show example approaches for selecting and/or determining planar region connectivity and relationships, according to another example embodiment of the present invention.

FIGS. 4A-4C show example approaches for selecting and/or determining planar region connectivity and relationships, in connection with example embodiments of the present invention. FIG. 4A shows adjacent superpixels (or planar regions) 410 and 412, connected partially at a point. FIG. 4B shows fully connected superpixels 420 and 422 that are out-of-plane, relative to one another. FIG. 4C shows adjacent superpixels 430 and 432 that are both fully connected and co-planar. Connected structures are processed and identified by choosing the parameters $s_i$ and $s_j$ to be on the boundary of the superpixels i and j. As shown in FIG. 4B, penalizing the distance between two such points ensures that they remain fully connected. In case of occlusion, the variables $y_{ij} = 0$, and hence the two superpixels are not be forced to be connected. The relative (fractional) distance between points $s_i$ and $s_j$ is penalized by $$h_{s_i, s_j}(\alpha_i, \alpha_j, y_{ij}, R_i, R_j) = \exp(-y_{ij} | (R_{i,s_i}^T \alpha_i - R_{j,s_j}^T \alpha_j) \hat{d} |)$$

Generally, the variable $v_i, s_i$ is an indicator of how good the image features are in predicting depth for point $s_i$ in superpixel i. This variable $v_i, s_i$ is learned from monocular image features, by estimating the expected value of $$|d_s - x_d^T \theta_r|/d_d \text{ as } \phi d$$

with logistic response, with $\phi r$ as the parameters of the model, features $x_i$ and $d_i$ as ground-truth depths.

Figure 5:
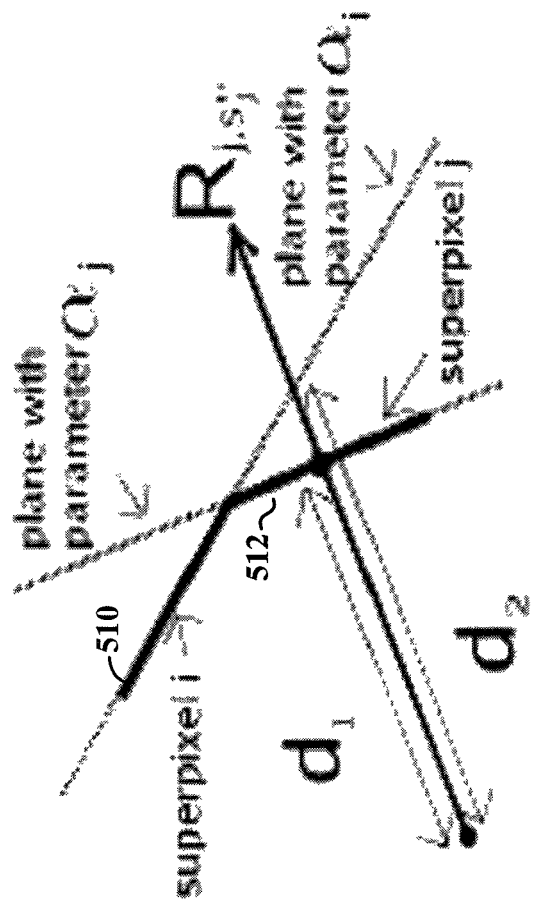
FIG. 5 shows a graphic representation of an approach to setting a co-planarity term used in generating three-dimensional image data, according to another example embodiment of the present invention.

FIG. 5 shows a graphic representation of an approach to setting a co-planarity term used in generating three-dimensional image data for two superpixels 510 and 512, according to another example embodiment of the present invention. In detail, $$R_d^T \alpha_i = 1/d_d, \text{ and } R_d^T \alpha_j = 1/d_d$$

therefore, the term $$(R_d^T \alpha_i - R_d^T \alpha_j) d$$

gives the fractional distance $$\left| (d_{i,s_i} - d_{j,s_j}) / \sqrt{d_{i,s_i} d_{j,s_j}} \right| \text{ for } d = \sqrt{\hat{d}_{s_i}, \hat{d}_{s_j}}$$

The distance of the point $s_j$ on superpixel j to the plane on which superpixel i lies along the ray $R_j, s_j''$ is given by $d_1 - d_2$.

The co-planar structure is enforced by choosing a third pair of points $s_i''$ and $s_j''$ in the center of each superpixel along with ones on the boundary, such as shown in FIG. 4C. To enforce co-planarity, the relative (fractional) distance of point $s_d''$ from the plane in which superpixel i lies, is penalized along the ray $R_{j,s_j''}$.

$$h_{s_j''}(\alpha_i, \alpha_j, y_{ij}, R_{j,s_j''}) = \exp(-y_{ij}|(R_{j,s_j''}^T \alpha_i - R_{j,s_j''}^T \alpha_j) \hat{d}_{s_j''}|),$$

with $$h_{s_i'',s_j''}(.) = h_{s_i''}(.)_{s_j''}(.).$$

Where two superpixels are coplanar, then $h_{s_i'',s_j''} = 1$. To enforce co-planarity between two distant planes that are not connected, three pairs of points are chosen and the above penalty is used. A co-linearity constraint is enforced using this term, by choosing points along the sides of long straight lines. This also helps to capture relations between regions of the image that are not immediate neighbors.

As exact parameter learning of the model is generally intractable, an approach such as Multi-Conditional Learning (MCL) is used for approximate learning, where the probability as a product of multiple conditional likelihoods of individual densities is modeled. The $\theta_r$ parameters are estimated by maximizing the conditional likelihood log $P(\alpha|X, Y, R; \theta_r)$ of the training data, which can be written as a Linear Program (LP). MAP inference of the plane parameters, (i.e., maximizing the conditional likelihood $P(\alpha|X, Y, R; \theta)$, is efficiently performed by solving a LP. For general information regarding MCL approaches, and for specific information regarding the use of MCL in connection with various example embodiments, reference may be made to A. McCalloum, C. Pal, G. Druck, and X Wang, "Multi-conditional learning: generative/discriminative training for clustering and classification," in AAAI, 2006, which is fully incorporated herein by reference.

In connection with other example embodiments, a pointwise MRF is used in generating three-dimensional image data, such as in connection with the above examples. Points in the image are used as a basic unit instead of superpixels and the 3-D location of the points is inferred. The nodes in this MRF are a dense grid of points in the image, where the value of each node represents its depth. The depths in this model are in log scale to emphasize fractional (relative) errors in depth. A deformable grid, aligned with structures in the image such as lines and corners, is used to facilitate desirable performance. Further, in addition to using the connected structure property, this model also captures co-planarity and co-linearity, and logistic response is used to identify occlusion and folds.

In the MRF below, the first term f(.) models the relation between depths and the image features as $$f_\theta(d_i, x_i, y_i) = \exp(-y_i |d_i - x_i^T \theta_{r(i)}|).$$

The second term g(.) models connected structure by penalizing differences in depth of neighboring points as $$g(d_i, d_j, y_{ij}, R_i, R_j) = \exp(-y_{ij} |(R_i d_i - R_j d_j)|).$$

The third term h(.) depends on three points i,j and k, and models co-planarity and co-linearity.

$$P(d \mid X, Y, R; \theta) = \frac{1}{Z} \prod_i f_\theta(d_i, x_i, y_i) \prod_{i,j \in N} g(d_i, d_j, y_{ij}, R_i, R_j)$$

$$\prod_{i,j,k \in N} h(d_i, d_j, d_k, y_{ijk}, R_i, R_j, R_k)$$

where, $d_i \in R$ is the depth at a point i. $x_i$ are the image features at point i. MAP inference of depths (i.e., maximizing log $P(s|X, Y, R; \theta)$) is performed by solving a linear program (LP), with the size of LP in this MRF being larger than in the aforesaid Plane Parameter MRF approach.

For each superpixel, a battery of features is computed to capture some of the monocular cues discussed above. Features are also computed to predict meaningful boundaries in the images, such as occlusion. Relying on a large number of different types of features facilitates the robustness of the algorithm and the generalization of the algorithm to images that are very different, for example, from a training or learning set of data.

Monocular image features are computed using different approaches. In some applications, for each superpixel at location i, texture-based summary statistic features and superpixel shape and location based features are computed. In one instance, the output is used for each of 17 (9 Laws masks, 2 color channels in YCbCr space and 6 oriented edges) filters $$F_n(x,y). \ n=1, \ldots 17 \text{ as: } E_i(n) = \Sigma_{(x,y) \in s_i} |I(x,y) * F_n(x,y)|^k.$$

where k=2,4 gives the energy and kurtosis respectively. This gives a total of 34 values for each superpixel. Features are computed for a superpixel to improve performance, with superpixel shape and location based features including the shape and location based features such as used in D. Hoiem, A. Efros, and M Herbert, Geometric context from a single image, in ICCV, 2005 (fully incorporated herein by reference), as well as the eccentricity of the superpixel.

Contextual information is captured by also including features from neighboring superpixels (e.g., four adjacent superpixels), and at multiple spatial scales (e.g., three spatial scales). The features, therefore, contain information from a larger portion of the image and thus are more expressive than just local features, making the feature vector $x_i$ of a superpixel 524 dimensional.

In some embodiments, boundary information is used as a cue for 3-D structure determination. For instance, if two neighbor superpixels of an image display different features, humans may perceive them to be parts of different objects. In this regard, an edge between two superpixels with distinctly different features is identified as a candidate for an occlusion boundary or a fold. In one implementation, the features $x_{ij}$ between superpixels i and j are computed by generating 14 different segmentations for each image for two different scales for seven different properties: textures, color, and edges. Each element of the 14-dimensional feature vector $x_{ij}$ is then an indicator as to whether two superpixels (i and j) lie in the same segmentation. The features $x_{ij}$ are the input to the classifier for the occlusion boundaries and folds as discussed herein.

In other example embodiments, object information is incorporated into the determination of three-dimensional features of an image. Such object information may include, for example, information from object recognizers such as those that recognize certain types of known objects. Such information is used to determine depth and/or location as relative to the same. For example, a person is more likely to be on top of the ground, rather than under it; as such, an object identified as a person is determined to be on top of the ground. For general information regarding approaches to identifying or using object information, and for specific information regarding the use of object information in connection with various example embodiments, reference may be made to D. Hoiem, A. Efros, and M Hebert, "Putting objects in perspective" in CVPR, 2006, which is fully incorporated herein by reference. Example object-based constraints are as follows:

(a) "Object A is on top of Object B." This constraint can be encoded by restricting the points $s_i \in R^3$ on object A to be on top of the points $s_j \in R^3$ on object B, i.e., $s_d^T d \geq s_i^T d$ (if d donates the "up" vector)

In some applications, a probabilistic version of this constraint is used and the inequality is represented in plane-parameter space $$(s_i = R_i d_i = R_i / (\alpha_i^T R_i)).$$

To penalize the fractional Error $$\xi = (R_i^T dR_j^T \alpha_j = R_j^T dR_i \alpha_i) d$$

(the constraint corresponds to $\xi \geq 0$), an MRF potential $h_{si,sj}$ (.)=$\exp(-y_{ij}(\xi + |\xi|))$ is used, where $y_{ij}$ represents the uncertainty in the object recognizer output. For $y_{ij} \to \infty$ (corresponding to certainty in the object recognizer), this becomes a "hard" constraint $$R_i^T d/(\alpha_i^T R_i) \geq R_j^T d/(\alpha_j^T R_j).$$

Other similar spatial-relations are encoded for certain applications by choosing the vector d appropriately. For example, a constraint "Object A is in front of Object B" can be encoded by choosing d to be the ray from the camera to the object.

(b) "Object A is attached to Object B." This approach is useful, for example, when the ground-plane is known from a recognizer, and many objects are more likely to be "attached"

to the ground plane. This is encoded by using a connected-structure constraint as described above.

(c) "Known plane orientation." If orientation of a plane is roughly known, such as when a person is more likely to be "vertical" than horizontal, this is encoded by adding a term $$f(\alpha_d) = \exp(-v_d|\alpha_i^T d|);$$

(e.g., to Equation 1 above). Here, $v_i$ represents the confidence, and d represents the up vector.

Various aspects of the present invention are exemplified in a number of illustrated implementations and applications, some of which are shown and characterized in the Appendices (including their incorporated figures) that form part of provisional patent application Ser. No. 60/903,187, to which benefit is claimed above and which are fully incorporated herein by reference. These Appendices are:

Appendix I: Learning 3-D Scene Structure from a Single Still Image (pages 1-9)

Appendix II: Learning Depth from Single Monocular Images (pages 1-8)

Appendix III: 3-D Depth Reconstruction from a Single Still Image (pages 1-13)

Appendix IV: Depth Estimation Using Monocular and Stereo Cues (pages 1-7)

While the invention is amenable to various modifications and alternative forms of the embodiments disclosed in the attached appendices, specifics thereof have been shown by way of example. It should be understood, however, that the intention is not necessarily to limit the invention to the particular embodiments described. On the contrary, the intention is to cover all modifications, equivalents, and alternatives falling within the spirit and scope of the invention as defined by the appended claims.

What is claimed is:

1. A method for estimating a three-dimensional depth map from still image data, the method comprising:
using a set of monocular images and corresponding ground-truth depth maps to determine a relationship between monocular image features and the depth of points in the monocular images; and
for different points in a particular image, using the determined relationship together with local and global image features including monocular cues to determine relative depths of the different points.

2. The method of claim 1, wherein using the determined relationship together with local and global image features including monocular cues to determine relative depths of the points includes using the determined relationship together with stereo cues from the still image and at least another image to determine relative depths of the points.

3. The method of claim 1, wherein using the determined relationship together with local and global image features including monocular cues to determine relative depths of the points includes using monocular cues including texture distribution and color channels and computing features at multiple spatial scales.

4. The method of claim 1, wherein using the determined relationship together with local and global image features including monocular cues to determine relative depths of the points includes preserving straight lines in the still image as straight lines in 3-D for determining the relative depths of points in the straight lines.

5. The method of claim 1, wherein using the determined relationship together with local and global image features including monocular cues to determine relative depths of the points includes using image features and depth data, connected structure data, co-planar structure data and co-linearity data for different portions of the image to determine the relative depths of the points.

6. A method for estimating three-dimensional depth from a still image using a model based upon a set of monocular images and their corresponding ground-truth depth maps, the method comprising:
for each of a plurality of different points in an image exhibiting local features for each point and global features for the entire image, using the model together with local and global image feature data including monocular image cues to determine a relative depth of the point.

7. The method of claim 6, wherein the step of using the model includes using the model to determine the depth of a planar region having a plurality of points, relative to another planar region having a plurality of different points.

8. A method for estimating three-dimensional image data from still image data using image regions, the method comprising:
using a set of monocular images and corresponding ground-truth depth maps to determine a relationship between monocular image features and the depth of points in the monocular images;
for each of a plurality of different regions in a still image, each region including a plurality of contiguous points in the image, using the determined relationship together with both local and global image features including monocular cues to determine the depth of the region relative to a reference location, and to determine the depth of the region relative to other regions in the image; and
using the determined depths to generate three-dimensional image data with the different regions of the image.

9. The method of claim 8, further including, for each of the plurality of different regions, using the determined relationships together with both local and global image features including monocular cues to determine the orientation of the regions as a function of region characteristics including, relative to immediately adjacent regions, the connectivity, planarity and linearity of the region.

10. The method of claim 8, wherein using the determined relationship together with both local and global image features includes using feature and edge data relative to neighboring image features to determine a degree of planarity of the image features.

11. The method of claim 8, wherein for each of a plurality of different regions in a still image, using the determined relationship together with both local and global image features including monocular cues to determine the depth of the region relative to a reference location, and to determine the depths of the region relative to other regions in the image includes computing the features $x_{ij}$ between superpixels i and j by
generating different segmentations for each image for two different scales for different properties of the superpixels, and
using the properties represented by the segmentations to indicate whether the superpixels i and j lie in the same segmentation and thereby classify occlusion boundaries and folds relative to each superpixel.

12. The method of claim 8, wherein using the determined depths to generate three-dimensional image data with the different regions of the image includes arranging the regions, relative to one another, in response to the determined depths.

13. The method of claim 8, further including determining a boundary at an edge of one of the regions in response to the edge connecting to a nearby edge that forms a contour in the image.

14. The method of claim 8, further including over-segmenting the still image data to generate the different regions as homogeneous planar-type regions, each region including a portion of an object in the image having similar color and texture.

15. The method of claim 8, further including, for each of the different regions of the image, computing image features characterizing monocular cues and boundaries in the image, and wherein the step of using the determined depths to generate three-dimensional image data includes using the computed image features to generate a three-dimensional image.

16. The method of claim 8,
further including, for each of the different regions of the image, computing image features characterizing monocular cues and boundaries in the image using the image data from the region and image data from an adjacent region, and
wherein using the determined depths to generate three-dimensional image data with the different regions of the image includes using the computed image features to generate a three-dimensional image.

17. The method of claim 8,
further including, for each of the different regions of the image, computing image features characterizing monocular cues and boundaries in the image by, for edges between regions exhibiting different monocular cues, determining that the edge is a candidate for an occlusion or a plane corner boundary, and
wherein using the determined depths to generate three-dimensional image data with the different regions of the image includes using the computed image features to compute boundary features for regions determined as having a candidate edge.

18. The method of claim 8, wherein using the determined relationship together with both local and global image features including monocular cues to determine the depth of the region relative to a reference location, and to determine the depth of the region relative to other regions in the image includes using the determined relationship together with both local and global image features including monocular cues with a Markov Random Field (MRF) to determine the depth of the region relative to other regions in the image.

19. A system for estimating a three-dimensional depth map from still image data, the system comprising:
a computer-based depth data generator arrangement, including a computer circuit, configured and arranged to determine a relationship between monocular image features and the depth of points in monocular images, using a set of monocular images and corresponding ground-truth depth maps, and
for different points in a particular image, use the determined relationship together with local and global image features including monocular cues to determine relative depths of the different points.

20. The system of claim 19, wherein the depth data generator uses the determined relationship together with local and global image features including monocular cues to determine relative depths of the points by using the determined relationship together with stereo cues from the still image and at least another image to determine relative depths of the points.

21. The system of claim 19, wherein the depth data generator uses the determined relationship together with local and global image features including monocular cues to determine relative depths of the points by using monocular cues including texture distribution and color channels and computing features at multiple spatial scales.

22. The system of claim 19, wherein the depth data generator uses the determined relationship together with local and global image features including monocular cues to determine relative depths of the points by preserving straight lines in the still image as straight lines in 3-D for determining the relative depths of points in the straight lines.

23. The system of claim 19, wherein the depth data generator uses the determined relationship together with local and global image features including monocular cues to determine relative depths of the points by using image features and depth data, connected structure data, co-planar structure data and co-linearity data for different portions of the image to determine the relative depths of the points.

24. A computer-based system for estimating three-dimensional image data from still image data using image regions, the system comprising a computer circuit including:
a learned model function to use a set of monocular images and corresponding ground-truth depth maps to determine a relationship between monocular image features and the depth of points in the monocular images;
a modeling processor to use the determined relationship together with both local and global image features including monocular cues to determine the depth of a region relative to a reference location, and to determine the depth of the region relative to other regions in the image, for each of a plurality of different regions in a still image, where each region includes a plurality of contiguous points in the image; and
a three-dimensional image renderer to use the determined depths to generate three-dimensional image data with the different regions of the image.

25. The system of claim 24, wherein the modeling processor uses the determined relationships together with both local and global image features including monocular cues, to determine the orientation of each of a plurality of regions as a function of region characteristics including, relative to immediately adjacent regions, the connectivity, planarity and linearity of each region.

26. The system of claim 24, wherein the modeling processor uses the determined relationship together with both local and global image features by using feature and edge data relative to neighboring image features to determine a degree of planarity of the image features.

27. The system of claim 24, wherein the modeling processor uses the determined relationship together with both local and global image features including monocular cues to determine the depth of the region relative to a reference location, and to determine the depths of the region relative to other regions in the image, by computing the features $x_{ij}$ between superpixels i and j by
generating different segmentations for each image for two different scales for different properties of the superpixels, and
using the properties represented by the segmentations to indicate whether the superpixels and j lie in the same segmentation and thereby classify occlusion boundaries and folds relative to each superpixel.

28. The system of claim 24, wherein the three-dimensional image renderer uses the determined depths to generate three-dimensional image data with the different regions of the image by arranging the regions, relative to one another, in response to the determined depths.

29. The system of claim 24, wherein the modeling processor over-segments the still image data to generate the different regions as homogeneous planar-type regions, each region including a portion of an object in the image having similar color and texture.

30. A method for estimating a three-dimensional depth map from still image data for a particular image, the method comprising:

using a set of monocular images and corresponding depth maps of the monocular images to model a relationship between monocular image features and the depth of points in the set of monocular images, the monocular images being different than the particular image;

using the modeled relationship for the monocular images to determine relative depths of different points in the particular image; and using the determined relative depths of the different points with the still image data to generate the three-dimensional depth map of the particular image.

31. The method of claim 30, wherein using the modeled relationship for the monocular images to determine relative depths of different points in the particular image includes using the modeled relationship together with stereo cues from the particular image and at least another different image to determine relative depths of the points in the particular image.

32. The method of claim 30, wherein using the modeled relationship for the monocular images to determine relative depths of different points in the particular image includes preserving straight lines in the particular image as straight lines in a three-dimensional image and determining the relative depths of points in the straight lines.

33. The method of claim 30, wherein using the modeled relationship for the monocular images to determine relative depths of different points in the particular image includes using image features, image depth data, connected structure data, co-planar structure data and co-linearity data for different portions of the image to determine the relative depths of the points.

34. The method of claim 30, wherein using the modeled relationship for the monocular images to determine relative depths of different points in the particular image includes, for each of a plurality of different regions in the particular image, each region including a plurality of contiguous points, determining the depth of each region relative to a reference location, and determining the depth of each region relative to other regions in the image, and using the determined relative depths of the different points with the still image data to generate the three-dimensional depth map of the particular image includes generating three-dimensional image data with the different regions of the image.

35. The method of claim 34, wherein determining the depth of each region relative to a reference location includes computing the features $x_{ij}$ between superpixels i and j by generating different segmentations for each region for two different scales for different properties of the superpixels, and using the properties represented by the segmentations to indicate whether the superpixels i and j lie in the same segmentation and thereby classify occlusion boundaries and folds relative to each superpixel.

36. The method of claim 34, wherein using the determined relative depths of the different points with the still image data to generate the three-dimensional depth map of the particular image includes arranging the regions, relative to one another, in response to the determined depths.

* * * * *

UNITED STATES PATENT AND TRADEMARK OFFICE
CERTIFICATE OF CORRECTION

| | | |
|---|---|---|
| PATENT NO. | : 8,472,699 B2 | Page 1 of 1 |
| APPLICATION NO. | : 11/944017 | |
| DATED | : June 25, 2013 | |
| INVENTOR(S) | : Ng et al. | |

It is certified that error appears in the above-identified patent and that said Letters Patent is hereby corrected as shown below:

In the Claims

Col. 16, line 60, Claim 27: "superpixels and j" should read --superpixels i and j--.

Signed and Sealed this
Fourteenth Day of October, 2014

Michelle K. Lee
*Deputy Director of the United States Patent and Trademark Office*